US008991742B2

(12) United States Patent
Alber et al.

(10) Patent No.: US 8,991,742 B2
(45) Date of Patent: Mar. 31, 2015

(54) ASYMMETRICAL SINGLE MAIN ROTOR UNMANNED AERIAL VEHICLE

(75) Inventors: Mark R. Alber, Milford, CT (US); Jessica Newman, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 134 days.

(21) Appl. No.: 13/532,212

(22) Filed: Jun. 25, 2012

(65) Prior Publication Data
US 2014/0008486 A1  Jan. 9, 2014

(51) Int. Cl.
*B64C 27/00* (2006.01)
*B64C 27/12* (2006.01)
*B64C 27/06* (2006.01)
*B64C 27/82* (2006.01)
*B64C 39/02* (2006.01)

(52) U.S. Cl.
CPC ............. *B64C 27/12* (2013.01); *B64C 27/06* (2013.01); *B64C 27/82* (2013.01); *B64C 39/024* (2013.01); *B64C 2027/8218* (2013.01); *B64C 2201/024* (2013.01)
USPC .................................................... 244/17.11

(58) Field of Classification Search
USPC ...... 244/17.21, 19, 11, 6, 7 R, 55, 7 A, 17.19; 446/36–45; D12/326, 327, 328, 329, D12/335; 416/134 A
See application file for complete search history.

(56) References Cited

U.S. PATENT DOCUMENTS

| | | | | |
|---|---|---|---|---|
| 2,720,271 A * | 10/1955 | Alex | ............... | 416/114 |
| 3,116,896 A * | 1/1964 | Sigler et al. | ............... | 244/2 |
| 3,248,073 A * | 4/1966 | Blythe | ............... | 244/17.11 |
| 3,744,743 A * | 7/1973 | Nay et al. | ............... | 244/17.11 |
| 3,921,938 A * | 11/1975 | Jupe et al. | ............... | 244/17.11 |
| 4,479,619 A * | 10/1984 | Saunders et al. | ............... | 244/60 |
| 4,720,059 A * | 1/1988 | Stearns, Jr. | ............... | 244/17.11 |
| 5,497,960 A * | 3/1996 | Previnaire | ............... | 244/17.11 |
| 5,779,190 A | 7/1998 | Rambo et al. | | |
| 5,836,545 A * | 11/1998 | Arlton et al. | ............... | 244/60 |
| 2007/0215751 A1 | 9/2007 | Robbins et al. | | |
| 2011/0049307 A1* | 3/2011 | Yoeli | ............... | 244/23 A |

FOREIGN PATENT DOCUMENTS

| | | | | |
|---|---|---|---|---|
| DE | | 4119388 A1 * | 12/1992 | ...... B64C 27/82 |
| DE | 10 2012 100 102.2 | * | 1/2012 | ...... B64C 27/04 |
| JP | | 05254492 A * | 10/1993 | ...... B64C 27/06 |

OTHER PUBLICATIONS

JP 05254492—english machine translation.*
(Continued)

*Primary Examiner* — Tien Dinh
*Assistant Examiner* — Alexander V Giczy
(74) *Attorney, Agent, or Firm* — Cantor Colburn LLP

(57) ABSTRACT

A single engine rotary wing aircraft is provided including a fuselage having a longitudinal first axis. A main rotor assembly is mounted to the fuselage for rotation about a second axis, perpendicular to the first axis. A tailboom is connected to an empennage. The tailboom is mounted to an end of the fuselage such that the tailboom is laterally offset from the first axis in a first direction. The rotary wing aircraft also includes a propulsion system. The single engine of the propulsion system is laterally offset from the first axis in a second direction opposite the first direction.

9 Claims, 5 Drawing Sheets

(56) References Cited

OTHER PUBLICATIONS

Naval Aviation News, "The MH-53E Minesweeping Super Stallion," Mar. 1982. Accessed from http://www.history.navy.mil/planes/mh-53e.pdf on Jul. 31, 2014. Available on Apr. 11, 2009 as documented by Internet Archive: https://web.archive.org/web/20090411091149/http://www.history.navy.mil/planes/mh-53e.pdf accessed Jul. 31, 2014.*

Navair, "Navy Model CH-53D Aircraft, Standard Aircraft Characteristics," Naviar 00-110AH53-2, Jun. 1971. Accessed from http://www.history.navy.mil/planes/ch-53d.pdf on Jul. 31, 2104. Available on Apr. 11, 2009 as documented by Internet Archive: https://web.archive.org/web/20090411092934/http://www.history.navy.mil/planes/ch-53d.pdf accessed on.*

* cited by examiner

ASYMMETRICAL SINGLE MAIN ROTOR UNMANNED AERIAL VEHICLE

BACKGROUND OF THE INVENTION

This invention relates to an aerial device and, more particularly, to the structure of such an aerial device.

Unmanned aerial vehicles (UAVs) are a powered aircraft with no human operator. They may fly autonomously or may be piloted remotely. Some UAVs are recoverable, while others are expendable after one flight. UAVs have been used for a variety of purposes, such as reconnaissance, surveillance, target acquisition, data acquisition, jamming, and ordnance delivery. This increased emphasis on the role of UAVs in society has led to advancements in both airframe design and propulsion systems.

Conventional rotary wing aircraft UAVs, such as the rotary wing aircraft 10 illustrated in FIG. 1, have a main rotor 40 mounted to a fuselage 20 to provide lift and thrust. A rotary wing aircraft UAV 10 can hover over a fixed spatial point and takeoff and land vertically, but has limitations when operating in confined areas due to the exposed rotors above the fuselage. As illustrated, the propulsion system 50 and the tail structure 30 are aligned with a central axis Z of the rotary wing aircraft 10. The engine 52 is stacked directly above the tail rotor drive shaft 54 to define the profile, and therefore the height, of a portion of the fuselage 20.

BRIEF DESCRIPTION OF THE INVENTION

According to one embodiment of the invention, a single engine rotary wing aircraft is provided including a fuselage having a longitudinal first axis. A main rotor assembly is mounted to the fuselage for rotation about a second axis, perpendicular to the first axis. A tailboom is connected to an empennage. The tailboom is mounted to an end of the fuselage such that the tailboom is laterally offset from the first axis in a first direction. The rotary wing aircraft also includes a propulsion system. The single engine of the propulsion system is laterally offset from the first axis in a second direction, opposite the first direction.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
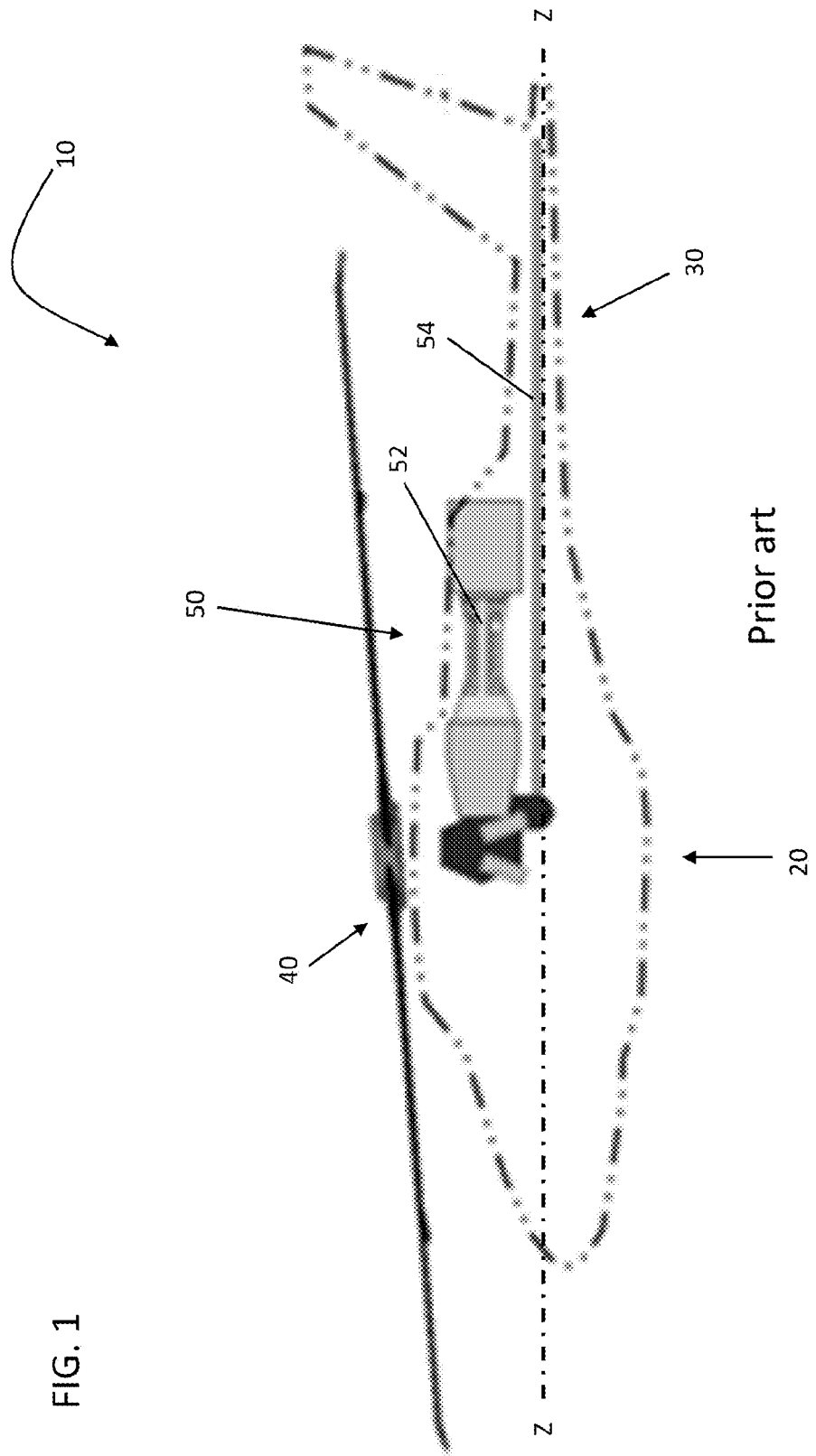
FIG. 1 is cross-section of an interior of a conventional single engine rotary wing aircraft.
Figure 2:
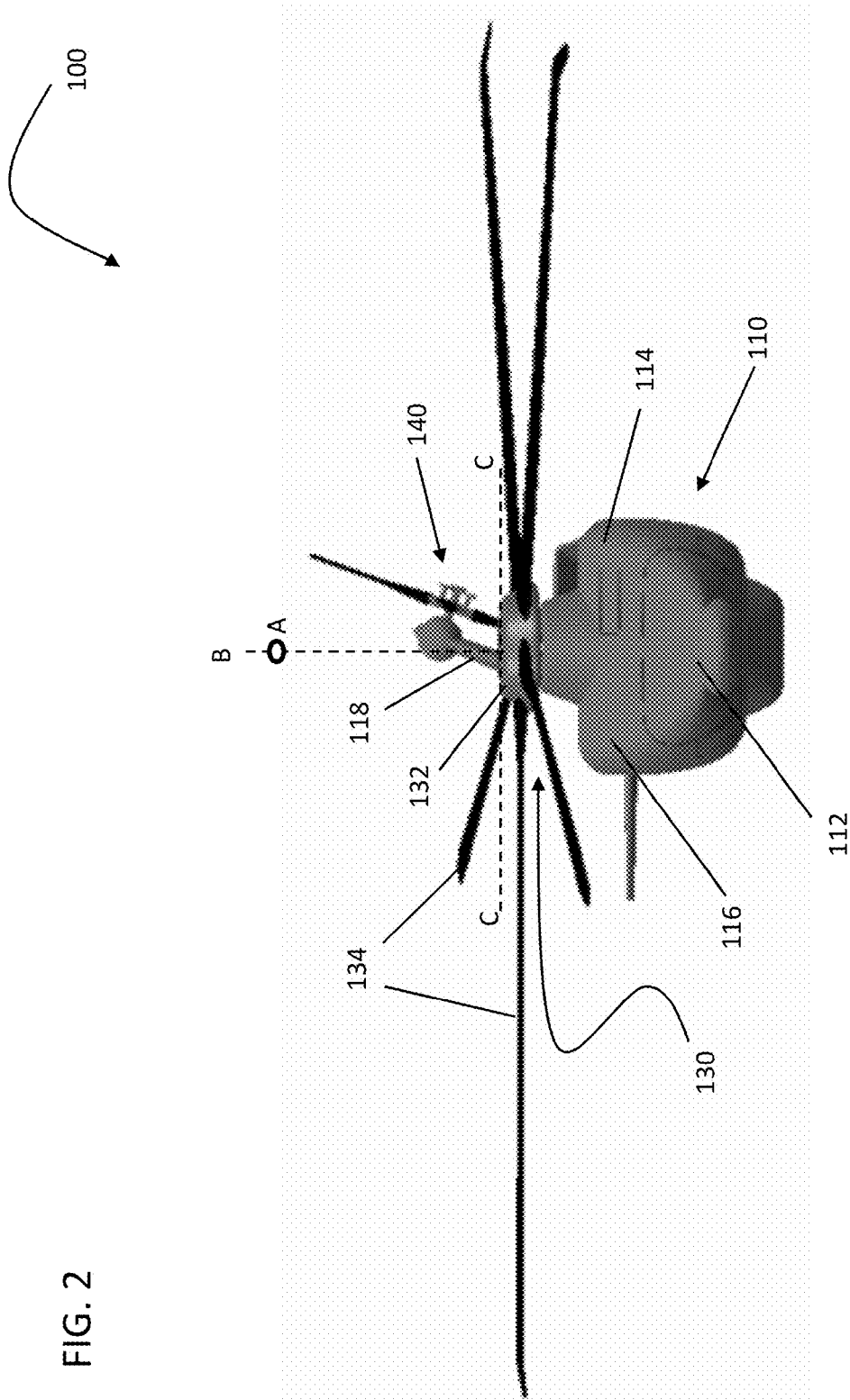
FIG. 2 is a front view of a rotary wing aircraft according to an embodiment of the invention.

The detailed description explains embodiments of the invention, together with advantages and features, by way of example with reference to the drawings.

DETAILED DESCRIPTION OF THE INVENTION

Referring now to FIGS. 2-5, multiple views of a rotary wing aircraft 100 according to an embodiment of the invention are illustrated. A person of ordinary skill in the art would understand that the described rotary wing aircraft may include an unmanned aerial vehicle. The rotary wing aircraft 100 is generally a conventional rotary wing aircraft modified by laterally offsetting a portion of the propulsion system and tail from a central axis. In one embodiment, the propulsion system includes a single engine. A fuselage 110 is connected to a nose 112 adjacent a first end and a tail boom 118 adjacent a second, opposite end. The nose 112 is generally symmetrical about a central plane A, parallel to the length of the rotary wing aircraft 100. Attached to the tail boom 118 of the fuselage 110 is an empennage 120 having a generally vertical fin 122 and a generally horizontal stabilizer fin 124. A main rotor assembly 130 is mounted centrally to the fuselage 110 along plane A, such as with a shaft (not shown) for example. The main rotor assembly 130 is driven about an axis of rotation B by a main gearbox 160 coupled to an engine 172 (see FIGS. 6 and 7). The main rotor assembly 130 includes multiple rotor blade assemblies 134 mounted to a central rotor hub 132. In one embodiment, a tail rotor assembly 140, is mounted to the vertical fin 122, and similarly includes a plurality of blades 142 movable about a central axis (not shown) of the tail rotor assembly 140. The tail rotor assembly 140 counteracts the torque produced by the main rotor assembly 130 to steer the rotary wing aircraft 100.

Figure 3:
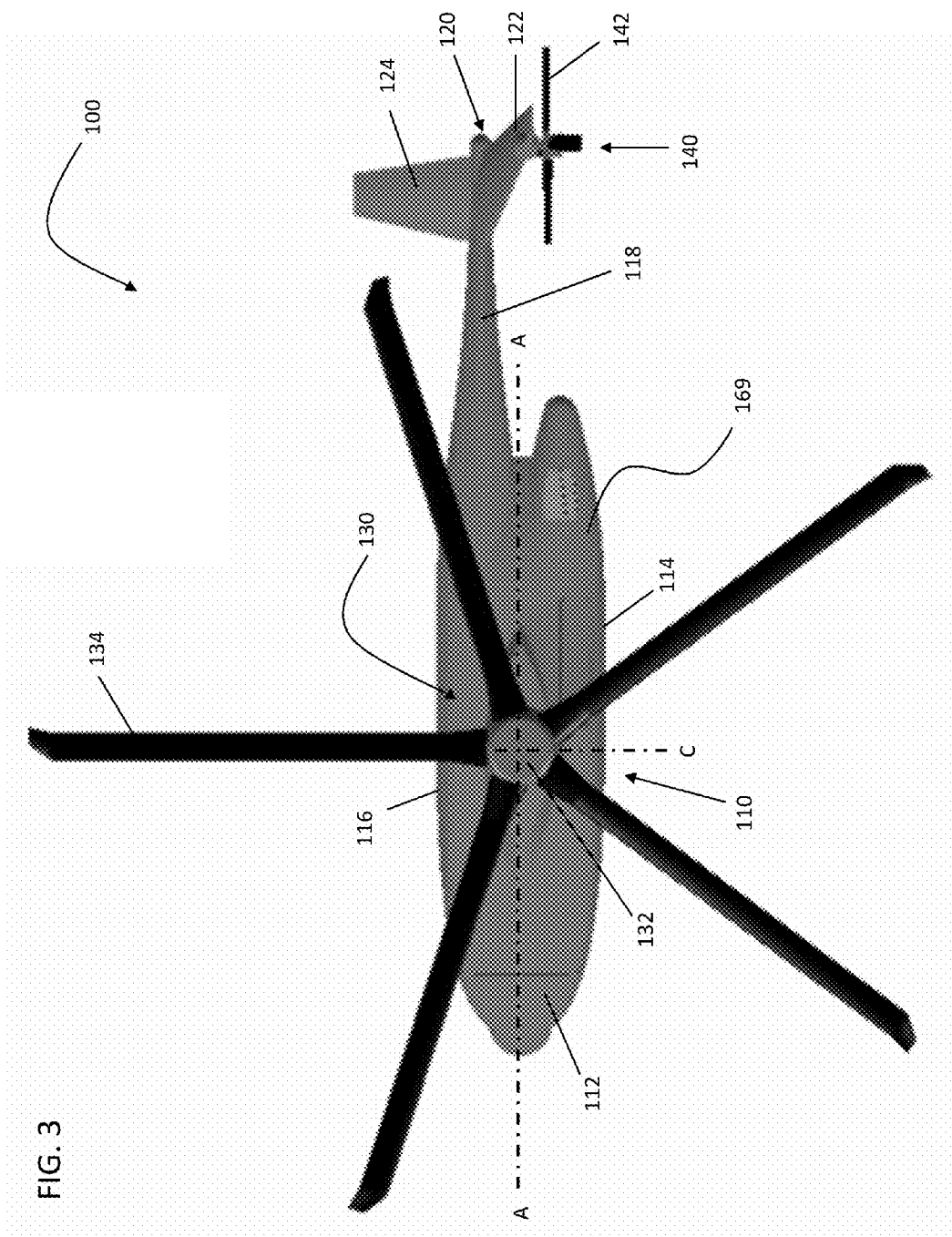
FIG. 3 is a top view of a rotary wing aircraft according to an embodiment of the invention.
Figure 4:
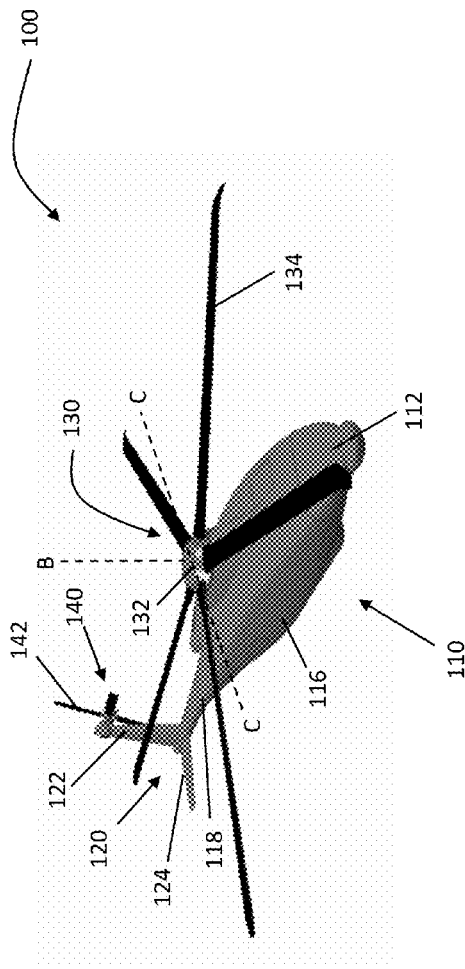
FIG. 4 is a perspective view of a rotary wing aircraft according to an embodiment of the invention.
Figure 5:
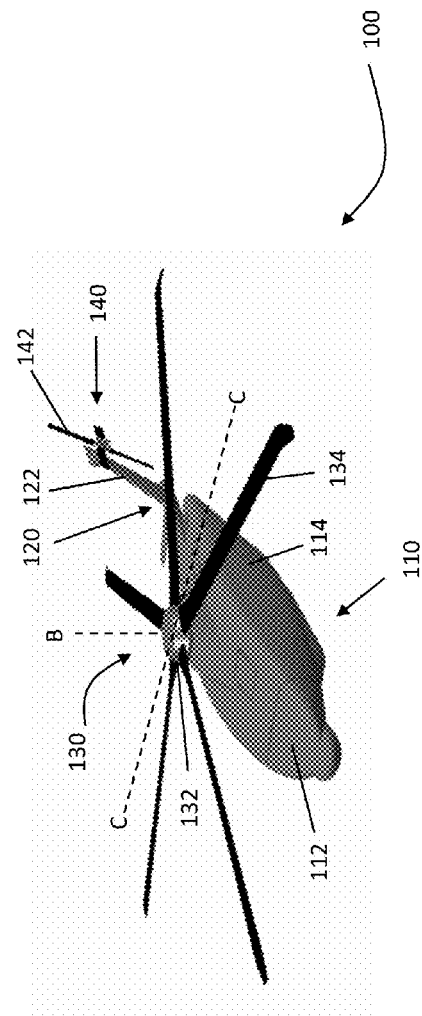
FIG. 5 is an alternate perspective view of a rotary wing aircraft according to an embodiment of the invention.

As shown in the top view of the rotary wing aircraft 100 illustrated in FIG. 3, a central plane A divides the fuselage 110 longitudinally into a first section 114 and a second section 116. Portions of the first section 114 and the second section 116, such as between the nose 116 and axis C of the main rotor assembly 130, may be symmetrical about plane A. However, the portions of the first section 114 and the second section 116 aft of the main rotor assembly 130, located between the tail boom 118 and axis C, are asymmetrical about plane A. In one embodiment, the tail boom 118 is connected to only the second section 116 of the fuselage 110 such that the tail boom 118 is laterally offset from central plane A in a first direction. The portion of the propulsion system 170 coupled to the tail rotor assembly 140, such as the tail rotor drive shaft 180 for example, is located within the second section 116 of the fuselage 110.

The first section 114 of the central portion of the fuselage 110 includes a cavity for housing a main portion of the propulsion system 170, such as an engine or other equipment of the rotary wing aircraft 100 for example. In one embodiment, the first section 114 of the fuselage 110 includes a nacelle 169. When located within the first section 114, the main portion of the propulsion system 170 is laterally offset from the central plane A in a second direction, opposite the offset direction of the tail boom 118. The first section 114 may be aerodynamically shaped and may include an inlet (not shown) for supplying air to the propulsion system 170 and an exhaust (not shown) for releasing air into the atmosphere. In addition, the first section 114 may include a removable door (not shown) that enables access to the interior of the first section 114, including the propulsion system 170.

Figure 6:
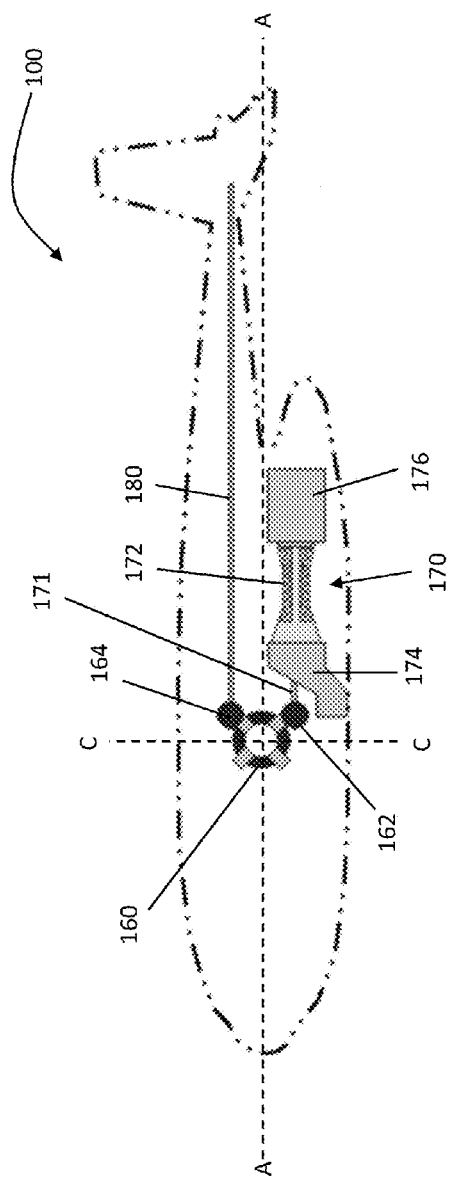
FIG. 6 is a top view of an interior of a rotary wing aircraft according to an embodiment of the invention.
Figure 7:
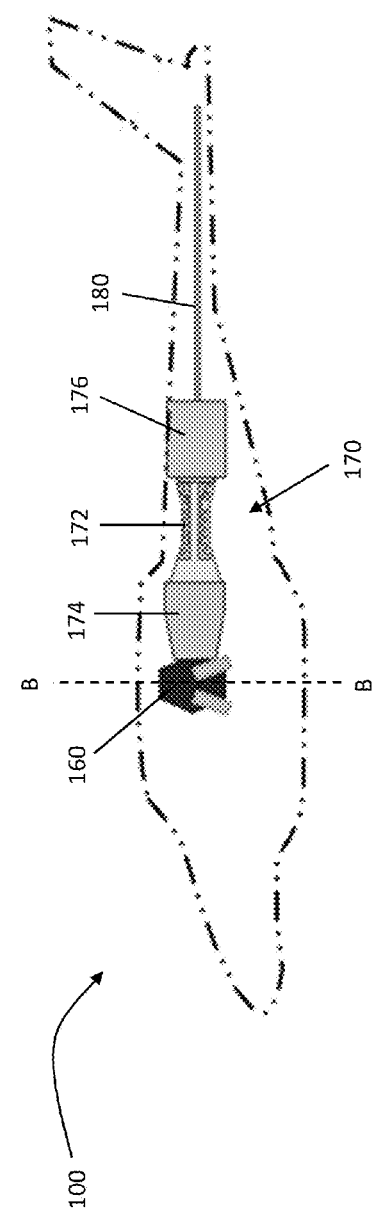
FIG. 7 is a cross-section of a rotary wing aircraft according to an embodiment of the invention.

Referring now to FIGS. 6 and 7, the propulsion system 170 of the rotary wing aircraft 100 is shown in greater detail. The main gearbox 160 is mounted to the shaft (not shown) of the main rotor assembly 130 for rotation about axis B. In one embodiment, an engine 172 of the propulsion system 170, such as a gas turbine engine for example, is housed within the first section 114 of the fuselage 110 aft of the main rotor assembly 130. An engine shaft 171 couples the engine 172 to an engine input 162 of the main gearbox 160 such that operation of the engine 172 causes rotation of the main gearbox 160, and therefore rotation of the main rotor assembly 130 about axis B. In one embodiment, the engine input 162 of the main gearbox 160 is located within the first section 114 of the fuselage 110, offset from plane A. A first end of the engine 172 includes an air inlet or intake 174. The air intake 174 removes airborne particulate matter from the air entering the engine 172. A second, opposite end of the engine 172 includes an exhaust nozzle 176 that directs exhaust gases into the atmosphere adjacent the tail boom 118.

A tail rotor drive shaft 180 extends from a tail takeoff 164 of the main gearbox 160 in the second section 116 of the fuselage 110 through the tail boom 118. In one embodiment, the tail takeoff 164 and the engine input 162 are equally spaced to opposite sides of central plane A. The tail rotor drive shaft 180 may be supported by a plurality of bearing assemblies (not shown) along its length. The opposite end of the tail rotor drive shaft 180 is coupled to the tail rotor assembly 140. The tail rotor drive shaft 180 is indirectly coupled to the engine 172 via the main gearbox 160 such that operation of the engine 172 causes rotation of the tail rotor assembly 140.

By locating the tail structure and the propulsion system in a position laterally offset from a central axis of the rotary wing aircraft, the profile of the rotary wing aircraft is reduced. The main components of the rotary wing aircraft are located within the width of the fuselage 110, rather than stacked along the central plane A, aft of the main rotor assembly 130. This reduced height minimizes the drag of the rotary wing aircraft, and additionally allows the rotary wing aircraft to be stowed more easily within smaller size hangars. In unmanned aerial vehicle applications, the reduced profile also makes the rotary wing aircraft more difficult to see from a distance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A single engine rotary wing aircraft, comprising:
a fuselage having a longitudinal first plane extending centrally there through, the longitudinal first plane being configured to divide the fuselage into a first section and a second section;
a main rotor assembly mounted to the fuselage for rotation about a first axis, the first axis being arranged within the first plane;
a tailboom including an empennage extending from an end of the second section of the fuselage such that the tailboom is arranged substantially parallel to the first plane and is laterally offset therefrom in a first direction; and
a propulsion system configured to drive the main rotor assembly about the first axis, the propulsion system including an engine arranged within the first section of the fuselage, aft of the main rotor assembly, the engine being arranged substantially parallel to the first plane and laterally offset from the first plane in a second direction, the second direction being opposite the first direction, the engine and the tailboom being arranged within a horizontal plane to reduce a height of the rotary wing aircraft.

2. The rotary wing aircraft according to claim 1, wherein the first section and the second section are asymmetrical.

3. The rotary wing aircraft according to claim 2, wherein the tailboom is connected to the second section of the fuselage.

4. The rotary wing aircraft according to claim 2, wherein the first section of the fuselage includes a nacelle.

5. The rotary wing aircraft according to claim 2, further comprising:
a main gearbox coupled to the main rotor assembly and located within the fuselage along the first plane, the main gearbox having an engine input and a tail takeoff offset from the first plane.

6. The rotary wing aircraft according to claim 5, wherein the engine input is located in the first section of the fuselage and the tail takeoff is located in the second section of the fuselage.

7. The rotary wing aircraft according to claim 5, wherein a tail rotor drive shaft extends through the second section of the fuselage to couple a tail rotor assembly to the tail takeoff of the main gearbox.

8. The rotary wing aircraft according to claim 5, wherein the engine input and the tail takeoff are equally spaced from the first plane.

9. The rotary wing aircraft according to claim 1, wherein the rotary wing aircraft is an unmanned aerial vehicle.

* * * * *